(12) United States Patent
Goto

(10) Patent No.: US 8,448,738 B2
(45) Date of Patent: May 28, 2013

(54) ELECTRICAL COMPONENT MOUNTING STRUCTURE OF MOTORCYCLE

(75) Inventor: Toshiji Goto, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 231 days.

(21) Appl. No.: 12/815,481

(22) Filed: Jun. 15, 2010

(65) Prior Publication Data

US 2010/0314188 A1   Dec. 16, 2010

(30) Foreign Application Priority Data

Jun. 16, 2009   (JP) ................... 2009-143637

(51) Int. Cl.
*B62K 11/00* (2006.01)
(52) U.S. Cl.
USPC ........................................................... 180/219
(58) Field of Classification Search
USPC ........................................................ 180/219
See application file for complete search history.

(56) References Cited

U.S. PATENT DOCUMENTS

| 6,318,743 | B1 * | 11/2001 | Nakashima et al. | ....... 280/152.1 |
| 7,552,791 | B2 * | 6/2009 | Oohashi et al. | ............... 180/219 |
| 7,712,756 | B2 * | 5/2010 | Seki et al. | ..................... 280/272 |
| 2005/0067211 | A1 * | 3/2005 | Inaoka et al. | ................. 180/309 |
| 2007/0089923 | A1 * | 4/2007 | Oohashi et al. | ............... 180/229 |
| 2009/0050392 | A1 * | 2/2009 | Kakuta | ......................... 180/219 |
| 2009/0243380 | A1 * | 10/2009 | Tahara et al. | ............. 303/114.1 |

FOREIGN PATENT DOCUMENTS

| JP | 08-119170 A | 5/1996 |
| JP | 10-218057 A | 8/1998 |

* cited by examiner

*Primary Examiner* — Kevin Hurley
*Assistant Examiner* — Michael Stabley
(74) *Attorney, Agent, or Firm* — Troutman Sanders LLP

(57) ABSTRACT

In a motorcycle in which an electrical component including an engine control unit is mounted, a bridge bent to protrude upward is bridged between each of coupling portions in which a right and left pair of main frames and a right and left pair of body frames are coupled, and the engine control unit is disposed in an inner space of the bridge thereby to cover right and left sides of the engine control unit.

4 Claims, 5 Drawing Sheets

ELECTRICAL COMPONENT MOUNTING STRUCTURE OF MOTORCYCLE

CROSS-REFERENCE TO RELATED APPLICATIONS

This application is based upon and claims the benefit of priority of the prior Japanese Patent Application No. 2009-143637, filed on Jun. 16, 2009, the entire contents of which are incorporated herein by reference.

BACKGROUND OF THE INVENTION

1. Field of the Invention

The present invention relates to a structure for mounting an electrical component such as an ECU (engine control unit) in particular to a motorcycle.

2. Description of the Related Art

With regard to an electrical component of a motorcycle, there is mounted an electrical component such as an ECU for electronically controlling an engine or a battery when it comes to a large electrical component. In a case of the ECU in particular for example, since the ECU is quite an important member in terms of control of an engine, various artifices are made in order to secure protection or proper operation thereof.

For example, in a motorcycle described in Patent Document 1, an ECU for controlling an engine is mounted between a right and left pair of main frames extending backward from a steering head pipe rotatably supporting a front fork. It should be noted that in this example the ECU is provided between the pair of right and left main frames in a manner operable from a side of a vehicle. There is also known an example in which an ECU is mounted in a front side of a head pipe in an existing vehicle other than the above.

Further, in a motorcycle described in Patent Document 2, an electrical component mounting rib is formed integrally or comprehensively in a rear portion of an air cleaner disposed in an upstream side of an engine, so that a dead space surrounded by the air cleaner, a fuel tank mounting bracket, a battery and a seat rail is effectively used.

[Patent Document 1] Japanese Laid-open Patent Publication No. 10-218057

[Patent Document 2] Japanese Laid-open Patent Publication No. 8-119170

However, such an ECU is usually large in size and it is not necessarily easy to set a mounting position. Further, if the ECU is mounted near the steering head pipe (front side thereof for example), cabling of a control cable, a harness or the like is difficult, and it is not easy to cable so as not to damage cables due to friction between the ECU and the cable during driving.

Further, usage of many clamps in order to restrict a cabling position of cables increases a cost, and an attempt to prevent mutual interference between the ECU and the cable inevitably influences handling operationality. Thus, not only a mutual relation between the ECU and the cable but also a handling capability is largely influenced.

SUMMARY OF THE INVENTION

In view of the above circumstances, an object of the present invention is to provide an electrical component mounting structure for a motorcycle in which an electrical component or the like can be mounted properly and effectively and thereby cost reduction can be realized.

An electrical component mounting structure of a motorcycle of the present invention is an electrical component mounting structure in a motorcycle in which an electrical component including an engine control unit is mounted, the electrical component mounting structure includes: a bridge bent to protrude upward is bridged between each of coupling portions in which a right and left pair of main frames and a right and left pair of body frames are coupled, wherein the engine control unit is disposed in an inner space of the bridge thereby to cover right and left sides of the engine control unit.

Further, in the electrical component mounting structure of the motorcycle of the present invention, an engine suspension bracket is extended forward from a front portion of the bridge and the engine control unit is disposed behind the engine suspension bracket, and a rear wheel suspension system is mounted in a rear of the bridge and the rear wheel suspension system is disposed behind the bridge and the engine control unit.

Further, in the electrical component mounting structure of the motorcycle of the present invention, a wiring harness is connected from one side in a vehicle width direction to the engine control unit, and the wiring harness is cabled along an inner wall of the main frame in the one side.

Further, in the electrical component mounting structure of the motorcycle of the present invention, an intake path is disposed in a space between the respective right and left main frames and body frames and below the bridge, and a throttle body included as a part of the intake path is disposed to overlap with at least a part of the engine control unit in plain view.

Further, in the electrical component mounting structure of the motorcycle of the present invention, at least either one of a throttle cable and a fuel pipe is disposed displaced in the same side in which the wiring harness is cabled.

DETAILED DESCRIPTION OF THE PREFERRED EMBODIMENTS

Hereinafter, a preferred embodiment of an electrical component mounting structure for motorcycle according the present invention will be described with reference to the drawings.

Figure 1:
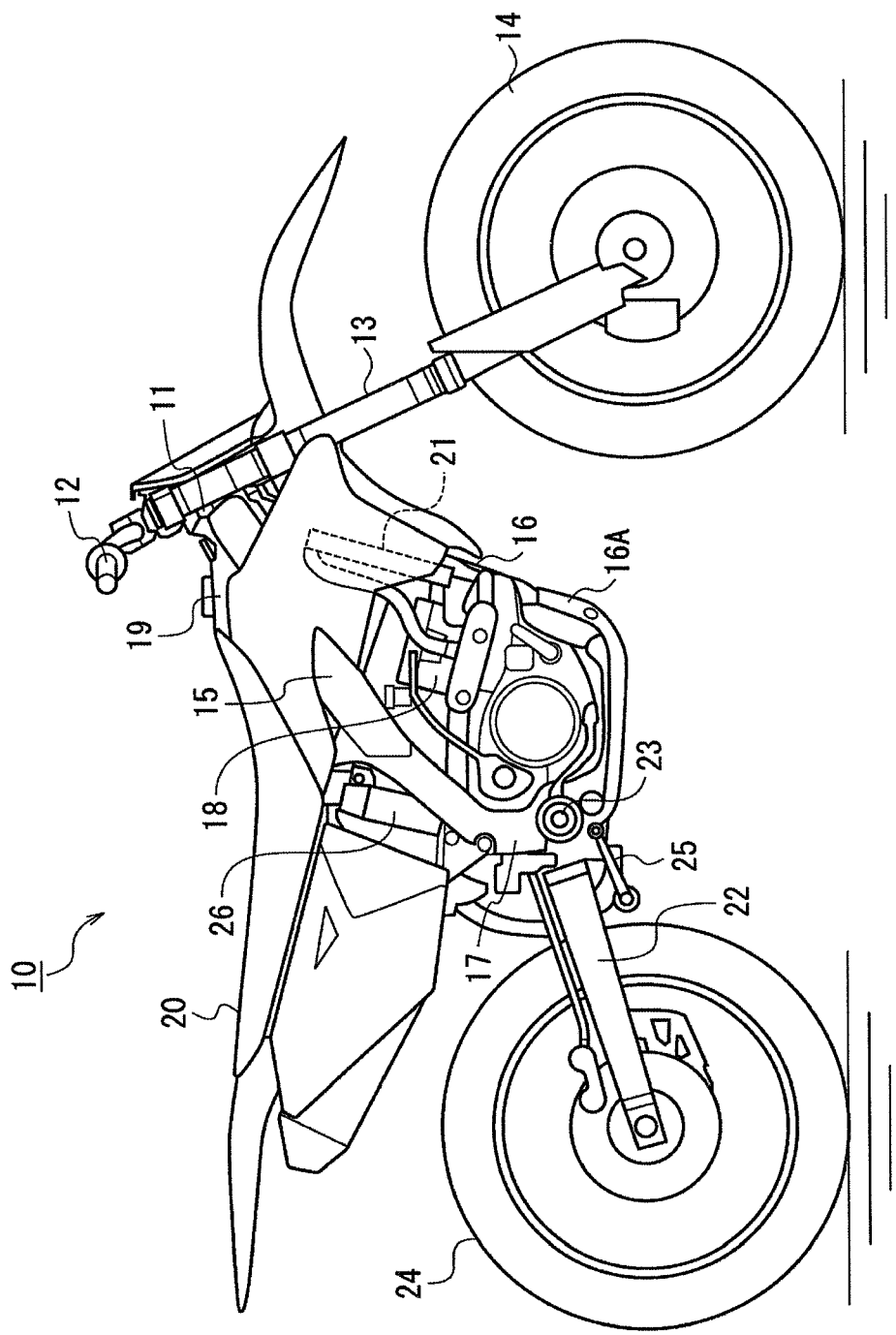
FIG. 1 is a side view showing an example of a motorcycle according to an embodiment of the present invention.

FIG. 1 is right side view of a motorcycle having the electrical component mounting structure according to the present invention, and first an entire constitution of a motorcycle 10 will be described by using FIG. 1. In the present embodiment an ECU (engine control unit) is mounted as an electrical component. It should be noted that in the following description in each drawing including FIG. 1 a front of the vehicle is indicated by an arrow Fr, a rear of the vehicle is indicated by an arrow Rr, a lateral right side of the vehicle is indicated by an arrow R, and a lateral left side of the vehicle is indicated by an arrow L, as necessary.

The motorcycle 10 of FIG. 1 can be typically an off-road type motorcycle, and a steering head pipe 11 is disposed in an upper part of a vehicle body front and a not-shown steering shaft is pivotally inserted through the steering head pipe 11. A handle 12 is bound to an upper end of the steering shaft, while a front fork 13 is mounted to a lower side of the steering shaft, a front wheel 14 being a running wheel being rotatably supported at a lower end of the front fork 13.

Further, a right and left pair of main frames 15 extends inclining obliquely downward from the steering head pipe 11 toward a vehicle body rear and a down tube 16 extends almost vertically downward. The down tube 16 branches into right and left lower frames 16A around a lower portion of the down tube 16. A pair of these lower frames 16A extends downward and then is bent at almost a right angle toward the vehicle rear, a rear end portion thereof is coupled with each rear end portion of the main frames 15 via the right and left pair of body frames 17.

In a space surrounded by the right and left pair of main frames 15 and the down tube 16 and the lower frames 16A and the body frames 17, an engine 18 of water-cooling type being a drive source is mounted, and a fuel tank 19 is provided above the engine 18, a seat 20 being provided in a rear thereof. Further, a radiator 21 is disposed in a front of the engine 18.

Front end portions of rear swing arms 22 are supported vertically swingable by means of a pivot shaft 23 by the right and left pair of body frames 17 provided at a lower portion of almost a center in a forward and backward direction of the vehicle body. A rear wheel 24 being a drive wheel is rotatably supported at rear end portions of the rear swing arms 22. The rear swing arms 22 are suspended from the vehicle body via a link mechanism 25 and a shock absorber 26 (rear wheel suspension system) connected thereto.

Figure 2:
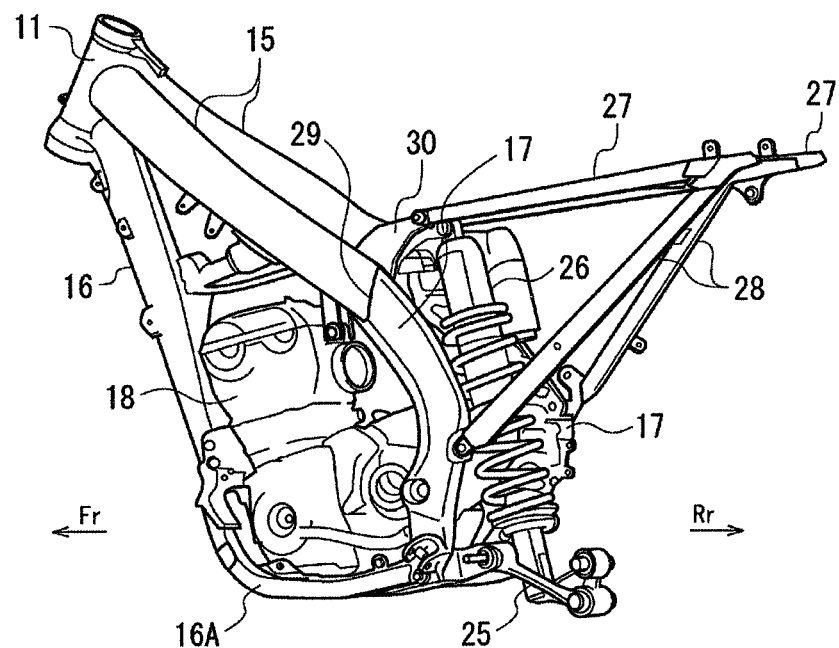
FIG. 2 is a perspective view showing a constitution example around a vehicle body main part of the motorcycle in the embodiment of the present invention.

Next, FIG. 2 shows a vehicle body main part of the motorcycle 10, that is, a vicinity of the engine mounted to the vehicle body frame. As described above, the engine 18 is mounted in the space surrounded by the main frames 15, the down tube 16, the lower frames 16A and the body frames 17. A pair of sheet rails 27 and a pair of seat pillars 28 for supporting the seat 20 extend backward from the vehicle body frames directly or indirectly. The seat rails 27 are installed almost horizontally and the seat pillars 28 are installed posterosuperiorly, the seat rails 27 are joined to the vehicle body frame (more specifically, coupling portion of the main frames 15 and the body frames 17) via a later-described bridge.

Here, in the portion at which the right and left pair of main frames 15 and the right and left pair of body frames 17 are coupled (simply referred to as a coupling portion 29), as shown in FIG. 2, a bridge 30 is provided between the right and left pair. In this example, the bridge 30 is disposed almost correspondingly to the coupling portion 29, and supports the shock absorber 26 and the like other than the seat rails 27. In other words, the bridge 30 fundamentally has a mounting function of the rear wheel suspension system and simultaneously functions also as a stiff member constituting the vehicle body frame, having a multiple function capability including an engine-mounting function or the like in addition to the above.

Figure 3:
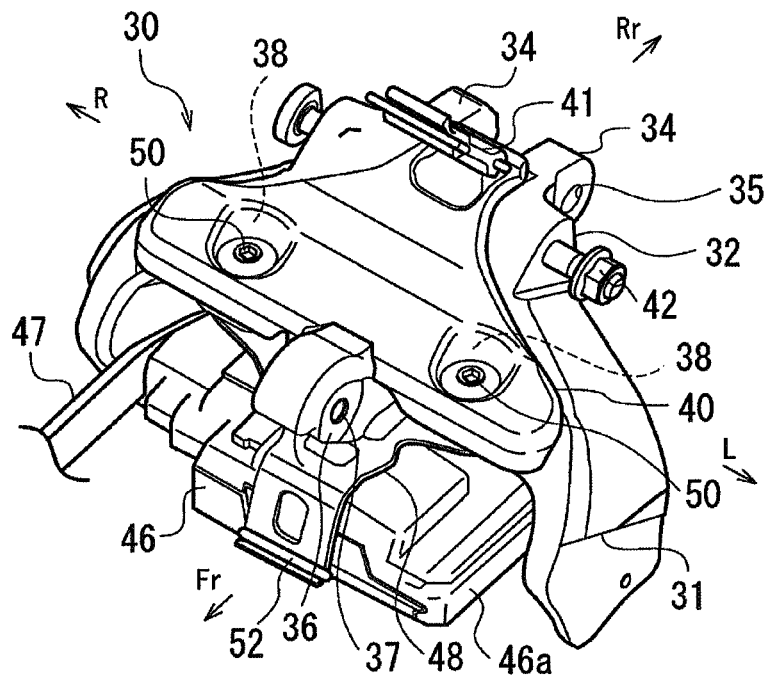
FIG. 3 is a perspective view showing an engine control unit mounted on a bridge in the embodiment of the present invention.
Figure 4:
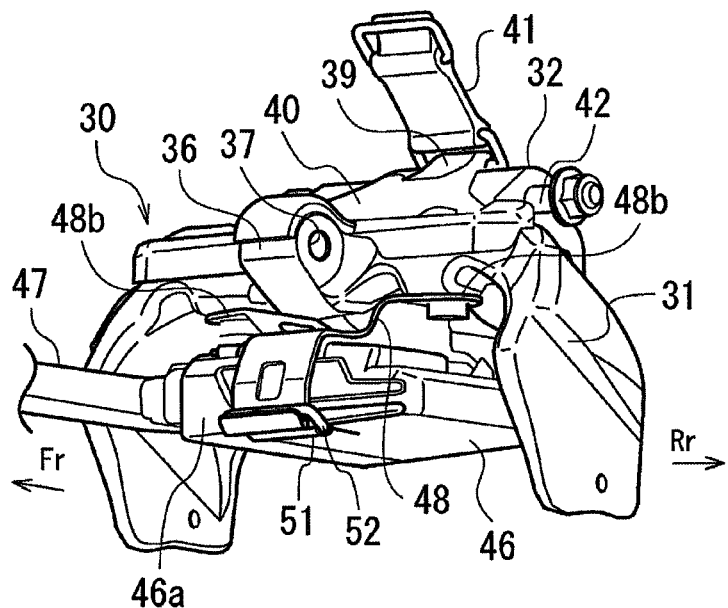
FIG. 4 is a perspective view of the engine control unit mounted on the bridge in the embodiment of the present invention.
Figure 6:
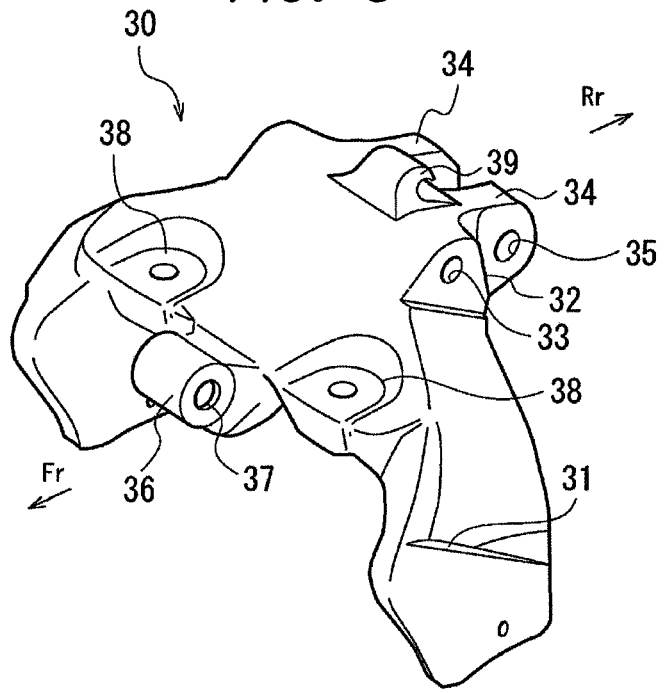
FIG. 6 is an upside perspective view of the bridge in the embodiment of the present invention.
Figure 7:
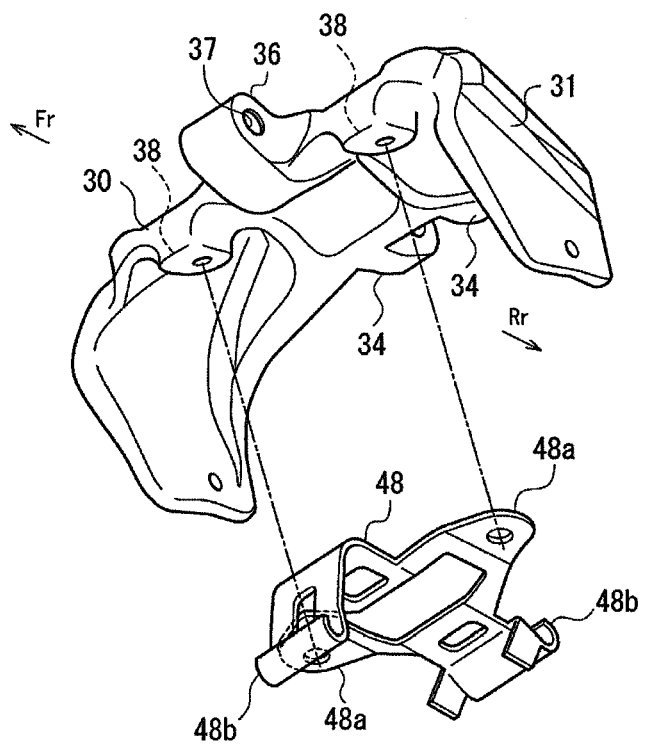
FIG. 7 is a downside perspective view of the bridge in the embodiment of the present invention.

FIG. 3 and FIG. 4 show the bridge 30 and a constitution example incidental thereto. It should be noted that FIG. 6 and FIG. 7, which show the bridge 30 itself, are referred to accordingly. The bridge 30 is typically a one-piece structure formed by molding or aluminum die casting and has an almost reversed U-shape for example in frontal view. In other words, the bridge 30 entirely is bent to protrude upward and a space is formed downward inside thereof. First, there are stepped portions 31 to abut on at a time of joining to the coupling portion 29 in both outside portions of the U-shape of the bridge 30, and with the stepped portion 31 abutting on the coupling portion 29, the bridge 30 is joined to inside of the coupling portion 29 in such a manner to fit thereinto.

In the bridge 30, further, a boss portion 32 for mounting the seat rails 27 thereto is projectingly provided near a top portion rear side, and a through hole 33 for inserting a bolt therethrough in a right and left direction is formed in the boss portion 32. In a further rear side of the boss portion 32, a pair of boss (or bracket) portions 34 for mounting the shock absorber 26 thereon is projectingly provided. A through hole 35 for inserting a coupling pin for supporting the shock absorber 26 is formed in the boss portion 34. Meanwhile, a boss (or bracket) portion 36 for mounting an engine mount bracket is projectingly provided in a top portion front side of the bridge 30, and a through hole 37 for inserting a bolt is formed in the right and left direction of the boss portion 36.

Further, a cushion 40 for supporting the fuel tank 19 is to be laid in the top portion front side of the bridge 30, and a pair of striker plates 38 (see also FIG. 6) for fixing the cushion 40 is recessedly provided. Further, above the boss portion 32, a hook 39 locking a set band 41 for fixing and holding the fuel tank 19 is projectingly provided.

Figure 5:
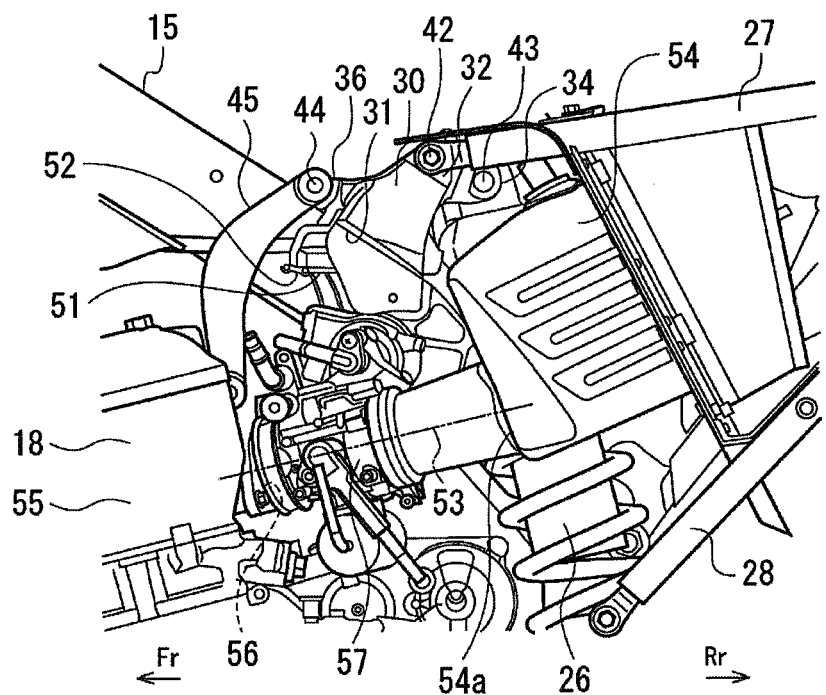
FIG. 5 is a side view showing the engine control unit and a peripheral member thereof mounted on the bridge in the embodiment of the present invention.

Further, with also reference to FIG. 5, a bolt 42 is inserted through the through hole 33 of the boss portion 32, and a front end portion of the seat rail 27 is joined to the bridge 30 via the bolt 42. Further, a coupling pin 43 is inserted through the through holes 35 of the boss portions 34, and an upper end portion of the shock absorber 26 is supported by the coupling pin 43. Further, a bolt 44 is inserted through the through hole 37 of the boss portion 36, and an upper end portion of the engine mount bracket 45 is joined to the bridge 30 via the bolt 44. It should be noted that a lower end portion of the engine mount bracket 45 is joined to a proper place (for example, can be near a cylinder head) of a cylinder block of the engine 18.

The bridge 30 is provided with a plurality of the boss portions 32, 34, 36, and thereby mounts and supports a plurality of members. The bridge 30 mounts and supports plural members in a gathered manner in such a limited space, exhibiting the multiple function capability while effectively utilizing the space.

In the present invention in particular, an ECU 46 is disposed in a space (inside of the reversed U-shape) downward from the bridge 30 as shown in FIG. 3 and FIG. 4. In the ECU 46, an electronic component or the like is housed in a casing 46a having almost a box shape, and the electronic component or the like is connected to a wiring harness 47 via a connecter. In this embodiment, the ECU 46 is mounted on the bridge 30 via a bracket 48. As described above, it is possible to have the space downward from an inside of the bridge 30 thereby to house the ECU 46 in this space completely, effectively protecting the ECU 46.

Figure 8:
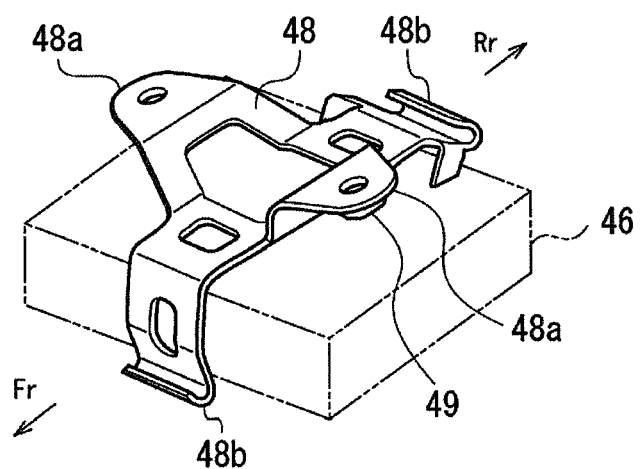
FIG. 8 is a perspective view of a bracket for mounting the engine control unit in the embodiment of the present invention.

FIG. 8 shows an example of the bracket 48 in the present embodiment. The bracket 48 can be integrally formed by pressing a plate material, and is bent-formed so that the bracket 48 protrudes to an upper side with a front and rear direction being a longitudinal direction, to support the ECU 46 from the upper side in an embracing manner. There is a pair of projecting pieces 48a extending right and left near a center portion of the bracket 48, and the bracket 48 is joined to the bridge 30 via the projecting pieces 48a. A nut 49 disposed in correspondence with the striker 38 of the bridge 30 is fixed to a backside (lower surface) of each projecting piece 48a, and a bolt 50 is screwed with the nut 49 in the striker 38 as shown in FIG. 3, whereby the cushion 40 and the bracket 48 are screwed together. By screwing together as above, the space is effectively utilized and a component number can be practically reduced.

Hooks 48b locking a set band 51 (see FIG. 5 and the like) for fixing and holding the ECU 46 are additionally provided/formed at a front end portion and a rear end portion of the bracket 48 respectively. Locking rings 52 are joined to both ends of the set band 51, and by locking each lock ring 52 to the hook 48b each, the bracket 48 can hold the ECU 46 properly and accurately as in FIG. 3 or FIG. 4.

Right and left sides of the ECU 46, supported by the bridge 30 via the bracket 48 as described above, are covered by the bridge 30. Further, as also shown in FIG. 5, the engine mount bracket 45 is provided extending forward from a front portion of the bridge 30, and the ECU 46 is disposed behind the engine mount bracket 45. Meanwhile, the shock absorber 26 is joined to a rear portion of the bridge 30, that is, the shock absorber 26 is disposed behind the bridge 30 and the ECU 46.

Further, in a space between the main frames 15 and the body frames 17 of right and left sides and formed below the bridge 30, an intake path 53 is set as indicated by a dot and dash line in FIG. 5. The intake path 53 passes almost horizontally and along the front and rear direction, and the ECU 46 is disposed above an intake system component around the intake path 53. It should be noted that the intake path 53 is set in almost the front and rear direction below the bridge 30 and is disposed to orient to the left in a vehicle width direction in some degree or obliquely right forward.

More specifically, an air cleaner box 54 is disposed behind the shock absorber 26 as in FIG. 5, and the intake path 53 is coupled with a lower portion of a front wall 54a of the air cleaner box 54. The intake path 53 is connected to an intake port 56 provided in a cylinder head 55 of the engine 18 and a throttle body 57 is included as a part of the intake path 53 along the way. In this case, at least a part of the ECU 46 is disposed to overlap with the throttle body 57 in plain view.

Further, as described above, the wiring harness 47 is connected to the ECU 46. In this case, the wiring harness 47 is connected to the ECU 46 from the vehicle width direction (right and left direction) and the wiring harness 47 is cabled along an inner wall of the main frame 15 of a connection side. Here, in this example, with reference to FIG. 3, since the ECU 46 is disposed displaced properly in the more left side in an inner space of the bridge 30, it is preferable that the wiring harness 47 is cabled in an opposite side thereof, that is, in a more right side of the inner space.

Further, a throttle cable operating/controlling the throttle and a fuel hose supplying fuel from the fuel tank 19 (neither is shown) is connected to the throttle body 57 from almost a front portion upward of the throttle body 57. These throttle cable and fuel pipe are disposed displaced in the same side (left side in this example) where the wiring harness 47 is cabled. It should be noted that at least one of the throttle cable and the fuel pipe can be disposed as above.

In an electrical component mounting structure in a motorcycle of the present invention, first, a bridge 30 bent to protrude upward is bridged between each of right and left coupling portions 29, and an ECU 46 is disposed in a manner that right and left sides thereof are covered by an inner space of the bridge 30. It is possible to mount a large-sized ECU 46 compactly by utilizing the space between right and left mainframes 15 and body frames 17 constituting vehicle body frames. In this case, since the ECU 46 is mounted in the inner space of the bridge 30 having high stiffness, the ECU 46 being an important component of a vehicle can be effectively protected.

The bridge 30 not only functions as a stiff member of the vehicle body but also has plural boss portions 32, 34, 36 thereby to support the seat rails 27, the shock absorber 26 being a rear wheel suspension system, or an engine mount bracket 45. As described above, the bridge 30 mounts and supports plural components in spite of a limited space and being a single member, and also in this point, effectively utilizing the space and exhibits a multiple function capability, so that a practical component number can be reduced, and further, cost can be reduced thereby.

Further, a wiring harness 47 connected to the ECU 46 is typically cabled along an inner wall of the main frame 15, whereby correlatively with a peripheral component, the wiring harness 47 and the like can be effectively protected. In this case, different from a portion of a large movability as around a steering, protection to the wiring harness 47 and the like effectively works. Since there is no possibility that a movable member is held up by the wiring harness 47 and the like, it consequently contributes to securing operational stability of the vehicle.

Hereinabove, the present invention is described with various embodiments. However, the present invention is not limited to only these embodiments but modification or the like is possible within a range of the present invention.

In the above embodiment, an example of the bridge 30 mounting and supporting plural members via the plural boss portions 32, 34, 36 is described, but it suffices if a bridge selectively has any one of the multiple function capabilities depending on a vehicle type.

According to the present invention, a bridge is provided between a right and left pair of frames and a large-sized engine control unit is mounted in the bridge. The bridge in addition originally has a mounting function of a rear wheel suspension system and exhibits a multiple function capability by a single member. By providing such a bridge, a space in a vehicle body frame can be effectively utilized and an engine control unit can be effectively protected.

Further, by the multiple function capability of the bridge, practical reduction of a component number and further reduction of a cost thereby can be realized. Further, a wiring harness and the like connected to the engine control unit is cabled preferably in relation to the vehicle body frame and the like, whereby the engine control unit can be effectively protected. In such a case, a movable member related to steering in particular is avoided to interfere with wiring harness and the like, and consequently, an effect such as contribution to securing operational stability can be obtained.

The present embodiments are to be considered in all respects as illustrative and no restrictive, and all changes which come within the meaning and range of equivalency of the claims are therefore intended to be embraced therein. The invention may be embodied in other specific forms without departing from the spirit or essential characteristics thereof.

What is claimed is:

1. An electrical component mounting structure in a motorcycle in which an electrical component including an engine control unit is mounted, the electrical component mounting structure comprising:

a bridge bent to protrude upward is bridged between each of coupling portions in which a right and left pair of main frames and a right and left pair of body frames are coupled, an engine suspension bracket is extended forward from a front portion of said bridge and the engine control unit is disposed behind the engine suspension bracket, and a rear wheel suspension system is mounted in a rear of said bridge and the rear wheel suspension system is disposed behind said bridge and the engine control unit, wherein the engine control unit is disposed in an inner space of said bridge thereby to cover right and left sides of the engine control unit.

2. The electrical component mounting structure of the motorcycle according to claim 1, wherein a wiring harness is connected from one side in a vehicle width direction to the engine control unit, and the wiring harness is cabled along an inner wall of the main frame in the one side.

3. The electrical component mounting structure of the motorcycle according to claim 2, wherein at least either one of a throttle cable and a fuel pipe is disposed displaced in the same side in which the wiring harness is cabled.

4. An electrical component mounting structure in a motorcycle in which an electrical component including an engine control unit is mounted, the electrical component mounting structure comprising:

a bridge bent to protrude upward is bridged between each of coupling portions in which a right and left pair of main frames and a right and left pair of body frames are coupled, an intake path is disposed in a space between the respective right and left main frames and body frames and in below said bridge, and a throttle body included as a part of the intake path is disposed to overlap with at least a part of the engine control unit in plain view, wherein the engine control unit is disposed in an inner space of said bridge thereby to cover right and left sides of the engine control unit.

* * * * *